Feb. 16, 1971   L. W. ALVAREZ ET AL   3,563,651
AIRCRAFT WARNING SYSTEM
Filed July 22, 1968
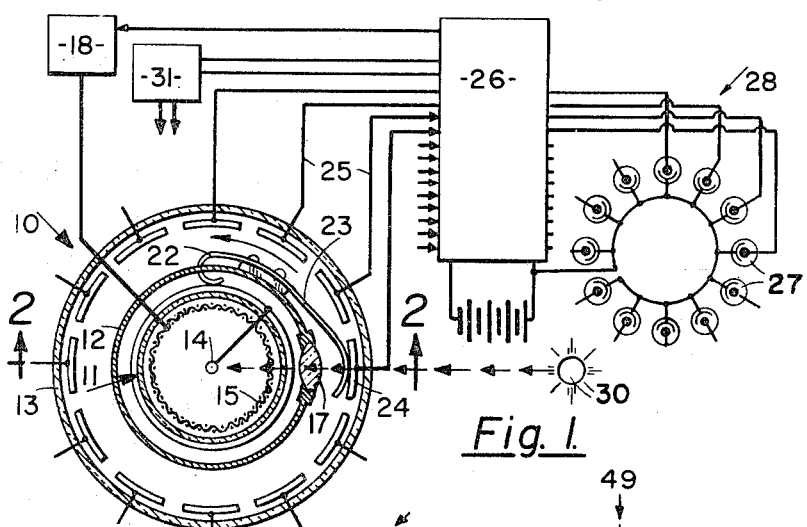
Fig. 1.
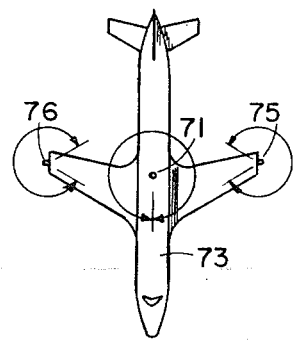
Fig. 6.
Fig. 5.
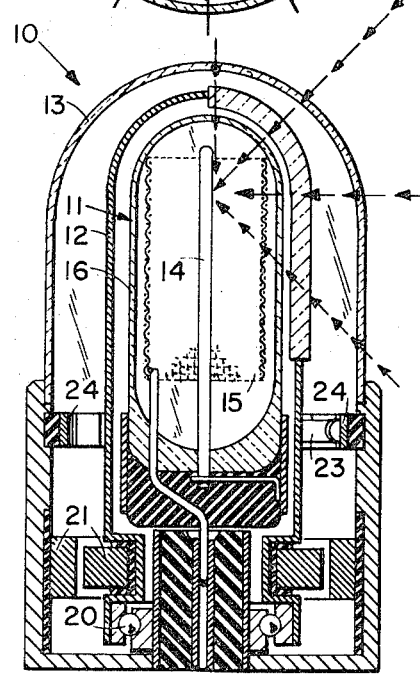
Fig. 2.
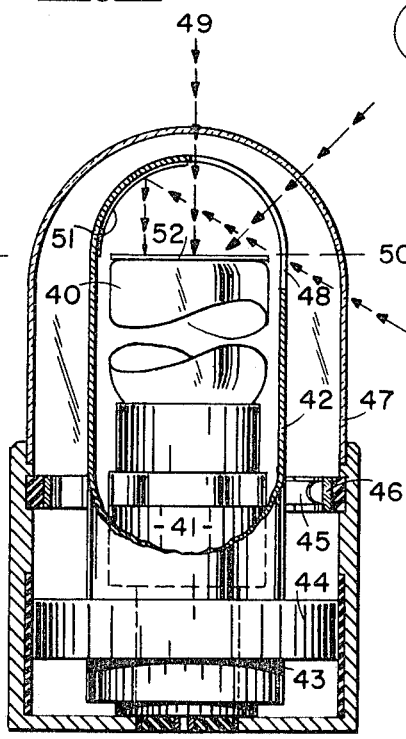
Fig. 3.
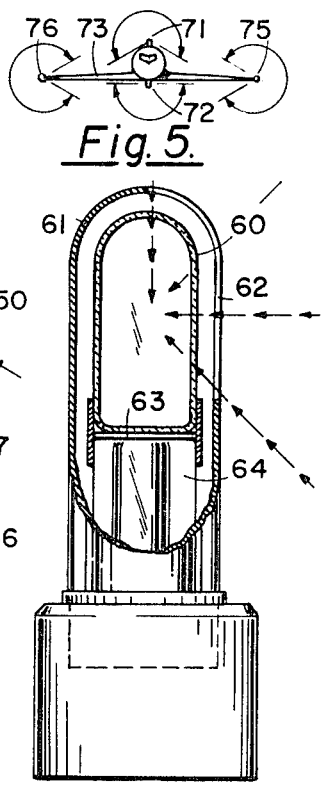
Fig. 4.
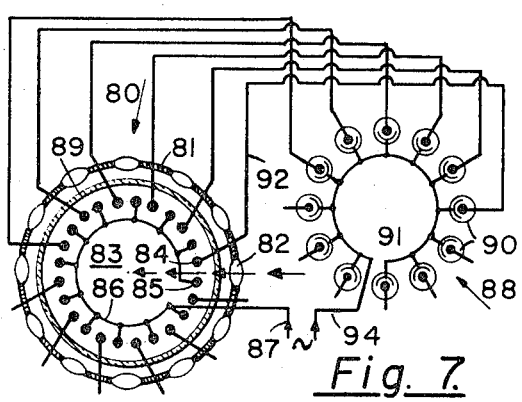
Fig. 7.
LUIS W. ALVAREZ
WILLIAM E. HUMPHREY
INVENTORS.
BY
Townsend and Townsend

United States Patent Office 3,563,651
Patented Feb. 16, 1971

3,563,651
AIRCRAFT WARNING SYSTEM
Luis W. Alvarez, Berkeley, and William E. Humphrey, Oakland, Calif., assignors to Optical Research and Development Corporation, Oakland, Calif., a corporation of California
Filed July 22, 1968, Ser. No. 746,375
Int. Cl. G01c 3/08
U.S. Cl. 356—4
13 Claims

ABSTRACT OF THE DISCLOSURE

An aircraft warning system in which a light source generates light in the wavelength range of 2,000 A. to 3,000 A. and a detector constructed and arranged to sense light only in the wavelength of a source is employed to render activation of a warning device upon detection of a light source. The detector and warning device are used in combination with sensing elements to register bearings of the light source.

---

The subject invention relates to a system for warning an aircraft of the presence of other aircraft within dangerous proximity by utilization of ultraviolet light emanating from other aircraft and by detecting the presence of the ultraviolet radiation.

In aviation it is desirable at all times to be aware of other aircraft within dangerous proximity. In the past, radar and other electronic monitoring observation systems have been employed with some success; however, the equipment heretofore employed either by weight, complexity or cost has not been adaptable for universal application.

The object of the present invention is to provide a simple and inexpensive aircraft warning system of such a nature as to be readily used on all aircraft so that a pilot would be warned of the existence of another aircraft within a danger zone. The object of this invention is to employ on each aircraft a radiation emitter such as a mercury vapor discharge device which can produce light in the range of 2,000 A. to 3,000 A. and to employ a detector sensitive to light only in the 2,000 A. to 3,000 A. wavelengths, mounted on aircraft to warn each aircraft so equipped.

In this invention it is contemplated that each aircraft be supplied with the relatively inexpensive ultraviolet light source. Aircraft requiring complete protection can be provided with the detector.

Light from the sun of the aforesaid wavelengths is substantially completely filtered by the "ozone layer" and such light is generated by only a few artificial sources. The world atmosphere is always in substantial blackness with respect to light within the aforesaid wavelengths, i.e., between 2,000 A. and 3,000 A. A feature and advantage of this invention lies in the fact that the detection system can operate with a high signal-to-noise ratio due to the lack of ambient light in the signaling light wavelength range.

Another feature and advantage of this invention lies in the fact that readily available, economical equipment is available for generating light within the aforesaid wavelength ranges as well as detectors thus enabling both the light source and the detectors to be economically installed on existing aircraft.

A further object of this invention is the provision of novel radiation detection devices particularly suitable for operation within a detection system of this invention. The light in the range of detection employed in the present system has a relatively limited radiation range through the atmosphere. However, effective detection of about three miles can be obtained with moderate power input to the radiation source. The aforesaid limiting factor of distance is particularly advantageous in the warning system in that the detection is limited to aircraft within the danger proximity range, thus, eliminating signals likely to confuse a pilot emanating from aircraft which are outside of the danger zone. This is particularly advantageous in areas of high aircraft density.

Another object of this invention is to combine the system with a sensing function so that the detector simultaneously or sequentially senses a range of radial sectors thereby affording the advantage of detection which is referenced to the bearing or radial sector of the sensed light source.

Another feature of this invention is the provision on the same plane of an ultraviolet light source and detection system in a time shared relationship operating in a mode which prevents the light from an aircraft's light source from being sensed by its own detector.

These and other objects of this invention will become apparent as the following specification progresses, reference being had to the accompanying drawings.

FIG. 1 is a diagrammatic view of an ultraviolet light detector shown in plan cross section and a warning system embodying the present invention;

FIG. 2 is a side cross-sectional view of the ultraviolet light detector illustrated in FIG. 1;

FIG. 3 is a side cross-sectional view of another form of ultraviolet light detector embodying the present invention;

FIG. 4 is a side cross-sectional view of yet another ultraviolet light detector embodying the present invention;

FIG. 5 is a front view; and

FIG. 6 is a partial plan view of an aircraft showing one arrangement for the aircraft warning system.

FIG. 7 is a diagrammatic view of an aircraft detector and directional warning system without moving parts.

According to the invention, it is contemplated that each fully equipped aircraft will include a set of detectors sufficient to scan the sky in all directions and an ultraviolet source or sources for emitting ultraviolet radiation in all directions for warning other aircraft. In order to prevent interference between the detectors and ultraviolet light sources on any particular aircraft, the detectors and light sources can be synchronized in the manner hereinafter described.

In the embodiment of the present invention illustrated in FIGS. 1 and 2 there is provided an ultraviolet light detector 10 formed by a mercury vapor detector 11, housed within a shield 12 and an outer envelope 13. The mercury vapor detector 11 includes a central axial cathode rod 14 and an elongated cylindrical anode screen 15 coaxially surrounding the cathode rod 14 within a gas filled tube 16. The tube 16 may be formed of fused quartz which is transparent to ultraviolet light. A small amount of mercury contained within the tube 16 is vaporized in the presence of argon gas. The shield 12 entirely encloses the mercury vapor detector 11 except for a longitudinal slit or elongated lens 17 in the shield 12. The outer envelope 13 which protects the mercury vapor detector, moving parts and commutator is formed of fused quartz or other ultraviolet transparent material. Ultraviolet light from the source 30 passes through the envelope 13 and slit lens 17 to the space between the anode and cathode of the mercury vapor detector 11. Ultraviolet light at the characteristic mercury vapor spectrum wavelength of 2,537 A. from an ultraviolet source 30 stimulates emission by the mercury vapor. The resulting change in the ionization of the gas and the conductivity between the anode and cathode thereby generates a signal at the cathode which is utilized to activate a warning system.

Selective detection of ultraviolet light in the range 2,000 A. to 3,000 A. may also be accomplished by providing a cathode formed of a metal which will photoelectrically emit electrons only in the range of wavelengths shorter than 3,000 A. Gases other than mercury vapor or mixtures of gases not including mercury can then be utilized in the detector tube. Such metals are for example tungsten, copper, rhodium and iron.

The shield 12 which is formed of metal or other material opaque to ultraviolet radiation is mounted for rotation on bearings 20 for rotation by motor 21 so that the surrounding space is scanned radially by the mercury vapor detector through the slit or lens 17. Electrical contact is maintained between the cathode 14 and shield 12 by means of a brush 22. The shield 12 includes a commutator arm 23 for sequentially making contact with a plurality of commutator electrodes 24 spaced concentrically around the base of the rotating shield, and stationary relative thereto. Each of the commutator electrodes 24 is provided with a separate electrical output wire 25 which is connected to a detector and amplifier 26 for detecting and amplifying signals generated at the mercury vapor detector cathode by ultraviolet radiation passing through the envelope 13 and slit or lens 17 onto the cathode within the lamp 11.

As the shield 12 rotates, contact is made between the commutator arm 23 and a commutator electrode 24 corresponding to the radial position of the slit or lens 17. As a result, incoming ultraviolet radiation produces an output signal only at the commutator electrode or electrodes corresponding to the azimuthal bearing of the source of ultraviolet radiation. Each of the electrodes 24 is connected through the detector and amplifier 26 to a neon bulb or lamp 27 in a radial warning display 28, each lamp 27 being fixed at a radial position in the warning display corresponding to the radial position around the detector of the electrode to which it is connected through the detector and amplifier 26. Thus, an ultraviolet source within the detectable range of the detector 10 will activate a warning light in the warning display 28 corresponding to the relative bearing of the ultraviolet radiation. The detector and warning display thereby indicate not only the presence of an ultraviolet source 30 within dangerous proximity of an aircraft, but also the relative bearing of the ultraviolet source 30 relative to the detecting aircraft. A range indication is also provided by a plurality of indicator lights arranged in a row in a radial direction outwardly from each warning lamp 27. Thus, the position of the illuminated light in any radial row indicates the general range of a selected aircraft in addition to the relative bearing indicated by the radial row. The strength of the selected signal can be used to appropriately activate the range indicating display.

The detector and amplifier 26 include a high voltage power source supply for the mercury vapor detector and other components activated by an airflow switch 31 which turns on the system when the aircraft is in flight. An alternator such as a flip-flop or a multivibrator may also be included in the circuit to switch the detector alternately on and off as the commutator arm 23 falls on and off the commutator electrodes 24. Thus, while the commutator arm 23 engages an electrode 24, the detector would be turned on and the aircraft's own ultraviolet light source turned off to eliminate detection of the aircraft's own ultraviolet light source. While the commutator 23 is intermediate electrodes 24, the detector would be switched off and the aircraft's own ultraviolet light source switched on to permit detection by other aircraft in the vicinity.

In the embodiment of the invention illustrated in FIG. 3 an alternate form of detector is shown in which detection is accomplished by a photomultiplier tube instead of a mercury vapor detector. The photomultiplier tube 40 is mounted on a stationary base 41 within a rotating shield 42. The shield 42 is mounted on the rotor bearings 43 of a motor 44 for rotation coaxially about the photomultiplier tube 40. A commutator arm 45 is mounted on the shield 42 for sequential contact with commutator electrodes 46 mounted concentrically around and stationary relative to the rotating shield 42 in the manner heretofore described. The photomultiplier tube and shield 42 are mounted within an outer envelope 47 of fused quartz which passes the incoming rays of ultraviolet light through to the shield 42. The shield 42 includes a narrow longitudinal scanning slit 48 extending from the zenith 49 to below the horizon level 50. Ultraviolet rays entering the directional slit 48 above the horizon level 50 fall directly on the sensitive surface of the photomultiplier tube through an ultraviolet filter which passes wavelengths in the far ultraviolet spectrum only. Ultraviolet rays passing through the envelope 47 and slit 48 from below the horizon 50 are reflected by a mirrored surface 51 formed on the inside of shield 42 across from the slit 48 so that the rays pass through the ultraviolet filter 52 and fall on the sensitive surface of the photomultiplier tube 40. Light of other wavelengths is filtered so that light in the far ultraviolet spectrum only is detected by the photomultiplier tube. The detector illustrated in FIG. 3 may be connected to a warning system such as the polar coordinates warning system illustrated in FIG. 1 to provide a warning signal and the relative bearing of an ultraviolet light source within dangerous proximity of the detecting aircraft in the manner described above.

In the detector illustrated in FIG. 4, detection is accomplished by combining the mercury vapor detector with a photomultiplier tube. The mercury vapor detector 60 is enclosed by a shield 61 which may be mounted for rotation in the manner heretofore described. Ultraviolet radiation at the characteristic mercury vapor spectrum wavelength of 2,537 A. passing through the slit 62 formed in the shield 61 is incident of the mercury vapor within the detector 60, stimulating emission of ultraviolet light in the far ultraviolet spectrum which falls on the sensitive surface of a photomultiplier tube 64. The cathode of the photomultiplier tube 64 maintains continuous electrical contact with the rotating screen 62 by means of a brush. The screen 62 may be provided with a commutator arm for sequential electrical contact with commutator electrodes spaced around the rotating screen in the manner heretofore described. The signals from the commutator electrodes may be connected to a warning display system similar to that illustrated in FIG. 1 for providing a warning signal and azimuthal bearing of an ultraviolet radiation source.

In each of the detectors described above a variety of warning systems may be utilized. Thus, instead of a polar coordinate visual display by means of a radial array of lamps, other sensory warning means may be used. For instance, a sound system may be utilized wherein a different coded warning signal is provided for different radial sectors of the horizon so that the azimuthal bearing of an ultraviolet radiation source may be determined from a coded audio warning signal. Other audio and visual warning systems may also be used. The sensory warning system can be adapted for either simultaneous or sequential indication of the presence or absence of aircraft in the different radial sectors. The strength of a sensed signal can be used as a general range indicator.

Arrangement of the ultraviolet light source detectors on an aircraft is shown by way of example in FIGS. 5 and 6. Detectors 71 and 72 are positioned above and below the horizontal plane of aircraft 73 in order to provide scanning in hemispheres above and below the plane of the aircraft. According to the arrangement illustrated in FIGS. 5 and 6, the warning system would indicate the relative bearing of an ultraviolet radiation source above or below the plane of the aircraft. As shown in FIG. 6, the detectors 71 and 72 provide the azimuthal bearing of an ultraviolet radiation source in horizontal planes relative to the aircraft. In FIG. 5, the detectors are oriented to scan in a plane orthogonal to the plane of the aircraft. Detectors may be combined for scanning both horizontal and vertical planes simultaneously, thereby providing separate polar coordinate bearing information in the upper and lower hemispheres. This provides a useful degree of elevation information with regard to the ultraviolet source.

In FIGS. 5 and 6 the aircraft's ultraviolet lamp sources 75 and 76 for warning other aircraft are positioned at the wing tips for radiation of ultraviolet light in all directions. As heretofore described, the detectors 71 and 72 and the ultraviolet lamps 75 and 76 may be synchronized so that the detectors do not see the ultraviolet emission of the sources 75 and 76. Thus, the detectors are switched off when the sources 75 and 76 are emitting ultraviolet rays, an emission by the sources 75 and 76 is cut off when the detectors 71 and 72 are switched on.

An aircraft detector and warning system operating without moving parts, which provides directional warning of aircraft within dangerous proximity is illustrated in FIG. 7. According to the embodiment of the invention shown in FIG. 7, a detector 80 is provided with a shield or housing 81 with a ring of lenses 82 formed therein for receiving and focusing light through a vacuum tight ultraviolet transparent envelope 89 into a chamber 83. The envelope may be formed of quartz or similar material. A circular array of alternating cathodes 85 and anodes 84 is formed concentrically with the ring of lenses inside the envelope 89 near its perimeter. The cathode may be formed in this as well as in the other embodiments of the invention of a metal which will emit electrons only at wavelengths less than the 3,000 A. range. Such metals, as for example tungsten, copper, rhodium or iron, as well as many others, have this characteristic and may be used with gases which may or may not include mercury, as is well known in photoelectric detection systems. The cathodes 85 are joined to a central terminal 86 which in turn is connected to one terminal of an A.C. source 87. The other terminal of the A.C. source 87 is connected by circuit line 94 to an electrically conducting disk 88 at terminal 91. The disk has a circular array of neon bulbs 90 formed around the perimeter and connected to the disk. Each neon bulb 90 is also connected to an anode 85 of the detector 80 through circuit lines 92 so that the angular or azimuthal direction of each neon bulb on disk 88 corresponds to the angular or azimuthal direction of the anode 85 to which it is connected. Light, including the far ultraviolet spectrum and the characteristic wavelength, is focused by a lens or lenses 82 onto the cathodes. Stimulated emission locally increases conductivity between anodes and cathodes in the direction of the ultraviolet source thereby causing a neon bulb or bulbs to be illuminated, providing a directional warning. When the ultraviolet source disappears the bulbs are immediately shut off because an A.C. source 87 is utilized.

According to this embodiment the horizon is simultaneously and continuously scanned. Thus, the invention contemplates both sequential and simultaneous scanning with or without moving parts.

In each of the embodiments of the invention the detector may be mounted on the aircraft for free movement relative to the aircraft and inertially stabilized for detection of ultraviolet light in a plane of maximum stability.

Although certain of the embodiments of the invention heretofore described utilizes selective detectors sensitive near the characteristic mercury vapor wavelength only, broad band detectors covering the range of 2,000 A. to 3,000 A. are also satisfactory. This is because the atmosphere is always in substantial darkness in these wavelengths due to absorption of such solar radiation by the "ozone layer" of the atmosphere. Thus, a photomultiplier tube or photocathode material, sensitive in the ultraviolet spectrum, and provided with a far ultraviolet spectrum filter can be used for a detector.

In the claims:

1. An aircraft warning system comprising: a light source mounted on a first aircraft, said light source adapted to produce light in the wavelength range between 2,000 A. to 3,000 A.; detection means mounted on a second aircraft, said detection means responsive to detect light only in the range of between 2,000 A. and 3,000 A.; and indicator means mounted within said second aircraft to indicate the detection and lack of detection of light by said detector.

2. A detection system according to claim 1, wherein said light source comprises a mercury vapor lamp emanating light in the wavelength of approximately 2537 A.

3. A device according to claim 1, wherein said detector comprises an envelope formed of ultraviolet transparent material, mercury vapor within said envelope and means to detect illumination of said mercury vapor occurring from stimulation by radiation thereon of light in the wavelength range of 2537 A.

4. A detection system as set forth in claim 1 wherein said detection means comprises a photoelectric detector adapted to emit electrons from a photoelectrical material only upon stimulation of said material by light of wavelengths of approximately 3000 A. or less.

5. An aircraft warning system as set forth in claim 1 wherein there is provided on the first aircraft an airswitch adapted to switch on the light source when the windspeed relative to the aircraft approaches the aircraft takeoff speed.

6. An aircraft warning system as set forth in claim 1 wherein said detector is adapted to scan radial sectors of a scanning horizon and said indicator means is adapted to indicate the relative bearing of a detected light source.

7. An aircraft warning system as set forth in claim 6 wherein said indicating means is also adapted to indicate the general range of the detected light source from the strength of the detected signal.

8. An aircraft warning system as set forth in claim 1 wherein said detector is inertially stabilized and mounted on the aircraft for free movement.

9. An aircraft warning system as set forth in claim 1 wherein said detector is adapted for simultaneously scanning the horizon in all directions in at least one plane, and said indicator means is adapted to indicate the relative bearing of a detected light source.

10. A method for detecting a first aircraft in a dangerous proximity range of a second aircraft comprising: emanating a light from said first aircraft at a predetermined wavelength in a wavelength range between 2,000 A. and 3,000 A. and detecting the presence of light only at said predetermined wavelength at said second aircraft.

11. A system for detecting the presence of a first aircraft from a second aircraft comprising: a light source having a predetermined wavelength within the range 2,000 A. to 3,000 A. mounted on said first aircraft positioned to emanate light in all directions; detection means mounted on said aircraft including means restricting the wavelength range of light detection of said detector to said predetermined wavelength within the range of 2,000 A. to 3,000 A.; scanning means mounted on said detector for scanning radial sectors of a scanning horizon; display means mounted within said aircraft, said display means actuated by said detector to provide a polar-coordinate sensory display of the bearing of the first aircraft relative to the second aircraft when the first aircraft is in dangerous proximity to the second aircraft.

12. A method of detecting aircraft within dangerous proximity of each other having the steps on each of the aircraft of: emanating light from said aircraft in substantially all directions therefrom at a predetermined wavelength between 2,000 A. and 3,000 A., detecting light only at said predetermined wavelength, preventing light emanating from said aircraft from being detected in said aircraft, and detecting light in a plurality of sectors to obtain a bearing reference of a detected light source.

13. An aircraft warning system comprising: a light source mounted on a first aircraft, said light source adapted to produce light in the far ultraviolet spectrum, and a far ultraviolet spectrum light detector mounted on a second aircraft.

References Cited

UNITED STATES PATENTS

| | | | |
|---|---|---|---|
| 2,560,265 | 7/1951 | Adler, Jr. | 343—112 |
| 2,943,201 | 6/1960 | Hicks, Jr. et al. | 343—112X |
| 3,113,211 | 12/1963 | Thews | 343—112 |
| 3,203,305 | 8/1965 | Fairbanks | 356—4 |

RODNEY D. BENNETT, JR., Primary Examiner

J. G. BAXTER, Assistant Examiner

U.S. Cl. X.R.

343—112.4